United States Patent [19]

Schabert et al.

[11] 4,044,898
[45] Aug. 30, 1977

[54] REACTOR FUEL ASSEMBLY LOCK TRANSPORT

[75] Inventors: Hans-Peter Schabert; Horst Pörner; Artur Bauer, all of Erlangen, Germany

[73] Assignee: Kraftwerk Union Aktiengesellschaft, Mulheim (Ruhr), Germany

[21] Appl. No.: 593,382

[22] Filed: July 7, 1975

[30] Foreign Application Priority Data

July 16, 1974 Germany .............................. 2434180

[51] Int. Cl.² ................................................ F23K 3/00
[52] U.S. Cl. ..................................... 214/18 N; 176/30
[58] Field of Search ................. 214/17 A, 17 B, 18 R, 214/18 N, 23–27; 176/30–32

[56] References Cited

U.S. PATENT DOCUMENTS

| 3,128,963 | 4/1964 | Erkes ................................... 214/17 B |
| 3,637,096 | 12/1972 | Crate ................................... 214/18 N |
| 3,756,914 | 9/1973 | Whittaker ........................... 214/18 N |
| B 373,344 | 2/1976 | Katz et al. .............................. 176/30 |

*Primary Examiner*—Trygve M. Blix
*Assistant Examiner*—Jesus D. Sotelo
*Attorney, Agent, or Firm*—Kenyon & Kenyon, Reilly, Carr & Chapin

[57] ABSTRACT

To transport fuel assemblies through a lock leading into a reactor containment, reciprocatory rods are used which releasably engage a sliding carriage carrying the fuel assemblies, at longitudinally interspaced points. This eliminates special transport equipment in the vicinity of the lock. The invention is of interest particularly for pressurized-water reactor installations.

6 Claims, 2 Drawing Figures

REACTOR FUEL ASSEMBLY LOCK TRANSPORT

BACKGROUND OF THE INVENTION

The invention concerns a nuclear reactor installation with a reactor containment and a lock leading through the containment, for fuel assemblies which are transported end-wise through the lock, on an elongated sliding carriage.

In the installation known, for instance, from U.S. Pat. No. 3,637,096 the sliding carriage has wheels powered by a drive motor of its own, carried by the carriage, and can, therefore, drive itself through the lock on rails which the wheels engage by means of friction. The power necessary for the locomotion is supplied to the motor, which is electric, via a cable whch is pulled off a stationary winch. If the propulsion motor at the sliding carriage fails, the sliding carriage can be pulled back by the winch winding up the cable. The stationary winch drive, therefore, is only an auxiliary device here and is usable only for one direction of travel, while its own movable drive at the sliding carriage is used in normal operation.

SUMMARY OF THE INVENTION

In contrast thereto, it is an object of this invention to simplify the design without an adverse effect on the safety. According to the invention, this objective is reached by the provision that the sliding carriage is detachably coupled with a stationary drive motor by a reciprocative rod movable in the carriage's direction of travel.

Through the rod, one obtains with a minimum of means, a reliable conveying possibility from a stationary motor, so that an additional motor carried on the sliding carriage becomes unnecessary. This permits substantial simplifications, especially as the positive force transmission required for safe transport, is provided by the rod in both directions of the carriage's travel.

Advantageously, the sliding carriage has two coupling points for the engagement of the rod, which are staggered or interspaced in the carriage's lengthwise direction. It can then be moved in stages by repeated strokes of the rod. Expressed in other words one can get along with a shorter stroke of the rod or even with a shorter rod for a given travel of the sliding carriage, so that the new drive can be accommocated even if the space is limited. In general, the rod will not have to be longer than the sliding carriage itself.

In one particularly safe embodiment of the invention, one drive with one rod each is arranged on each side of the containment's fuel assembly lock. This makes is possible to maintain the functioning of the lock in a simple manner also during the transport of the fuel assemblies, as then one side of the lock chamber can always be shut without having to consider the power supply cable of the carriage motor, as in the prior art case.

The rod may have teeth forming a gear rack, by means of which the rod is moved. As a tooth arrangement, can also be considered a threaded, rotary spindle which makes movement relative to a traveling nut possible.

The rod can be mounted, together with the drive, on a tilting device for the fuel assemblies, so that the tilting device can be used to guide the rod. The tilting device can then also be structurally combined with the drive, so that the latter does not require separate mounting means.

In another embodiment of the invention, the rod can be releasably coupled with the sliding carriage at both ends and is arranged with its drive near the lock. Here, the drive is therefore located about at the center of the carriage travel, which may be up to four times the stroke of the rod.

A movement about the longitudinal axis of the rod may be provided for coupling or decoupling the rod and the sliding carriage. However, other possibilities for coupling are also conceivable, for instance, hooks which are provided at the one end of the rod and make a secure, detachable fit possible.

DETAILED DESCRIPTION OF THE INVENTION

To explain the invention in further detail, two examples of embodiments will be described in the following, making reference to the drawings. Therein, only the part of the nuclear reactor plant which is essential for the invention is shown in respective longitudinal sections. The nuclear reactor, which may, for instance, be a pressurized-water reactor, is not shown for the sake of clarity.

Figure 1:
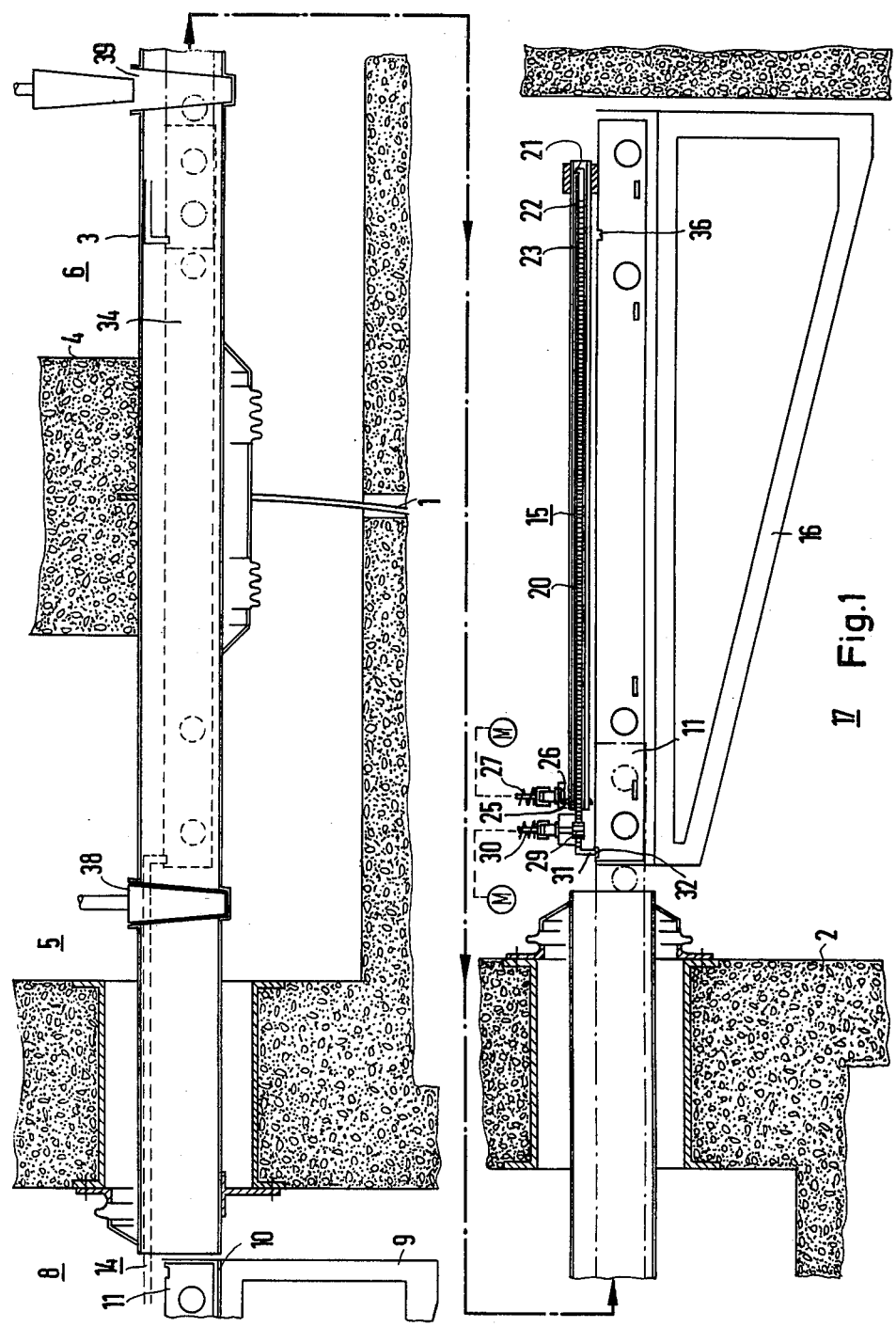
FIG. 1 is a vertical section through a fuel assembly lock to which the invention is applied.

In FIG. 1, a lock tube 3 goes through the conventional spherical containment shell (not shown), which consists of steel, the containment being enclosed by an outer concrete building 2. The completely closed pressure-tight containment 1 contains in its interior 5, all the reactivity-carrying parts which must be shut off from the outer space 6.

In the interior 5 is also located an inner fuel pit 8, in which a tilting device 9 for the elongated fuel assemblies of the pressurized-water reactor is arranged. The upper part 10 of the tilting device 9 lines up, in the position shown, with the lock tube 3, so that the sliding carriage, indicated at 11, can run from the tilting device 9 directly into the lock tube 3 for transporting the elongated fuel assemblies. For moving the carriage, two identical rod drives 14 and 15 are arranged on both sides of the lock 3, wherein the drive 14 is associated with the tilting device 9, while the other drive 15 is mounted on a tilting device 16 in an outer fuel pit 17.

In the following, only the drive 15 is described in detail, while the drive 14 of similar design, is not specifically shown. Part of the drive 15 is a gear rack 20, which is guided by a projection 21 in a slot 22 of the tube 23. The rack 20 is in mesh with a pinion 29, which can be driven by a drive shaft 30. When the pinion 29 runs, the rack 20 moves in the lengthwise direction in the tube 23. It then takes along the sliding carriage 11, with which it is connected via a gripper 31. The gripper 31 can be engaged or disengaged with or from the sliding carriage 11 at a slot 32, by rotating the rack 20. The rotation of the rack 20 is accomplished by rotating the tube 23 which is connected to a miter gear 25 driven by a drive shaft 27 via a second miter gear 26. The gears 25 and 26 form a right-angle gear drive.

If the sliding carriage 11 is to be transported from the position shown on the right-hand side of the figure at the tilting device 16, to the inner tilting device 9, the rack 20 is first turned so its gripper 31 enters the slot 32 of the sliding carriage 11, as shown. Then the rack 20 is moved, for one advance stroke by turning the pinion 29. At the limit of that stroke the rack is turned to release its gripper 31, and by a reverse stroke is brought back so its gripper can engage in the back carriage slot 36. Then, by a repeat forward stroke, the carriage is moved further through the lock. The sliding carriage travels twice the stroke of the rack 20 up to the position 34, in two steps.

When the sliding carriage 11 runs into the lock chamber from the right to the left, the inner lock gate 38 is initially closed but can be opened after the initially opened outer lock gate 39 is closed. Now, the inner rod drive 14 is actuated in the same manner as the outer drive 15. Thereby, the sliding carriage is pulled from the lock tube 3 onto the tilting device 9. The movement of the carriage in one direction of travel is thereby ended. The sliding carriage 11 can be secured on the tilting device 9, so that it can be tilted. For operating the securing arrangement, the miter gears 25, 26 can be used, for instance, which take care of coupling the rack 20. Thereby, position-dependent locking is also possible.

The sliding carriage is transported in the reverse direction, i.e., from left to right in FIG. 1 out of the containment, in the same manner, only with the inner rod drive 14 pushing the carriage 11 first into the lock tube 3, from which it is then pulled by the outer drive 15.

Figure 2:
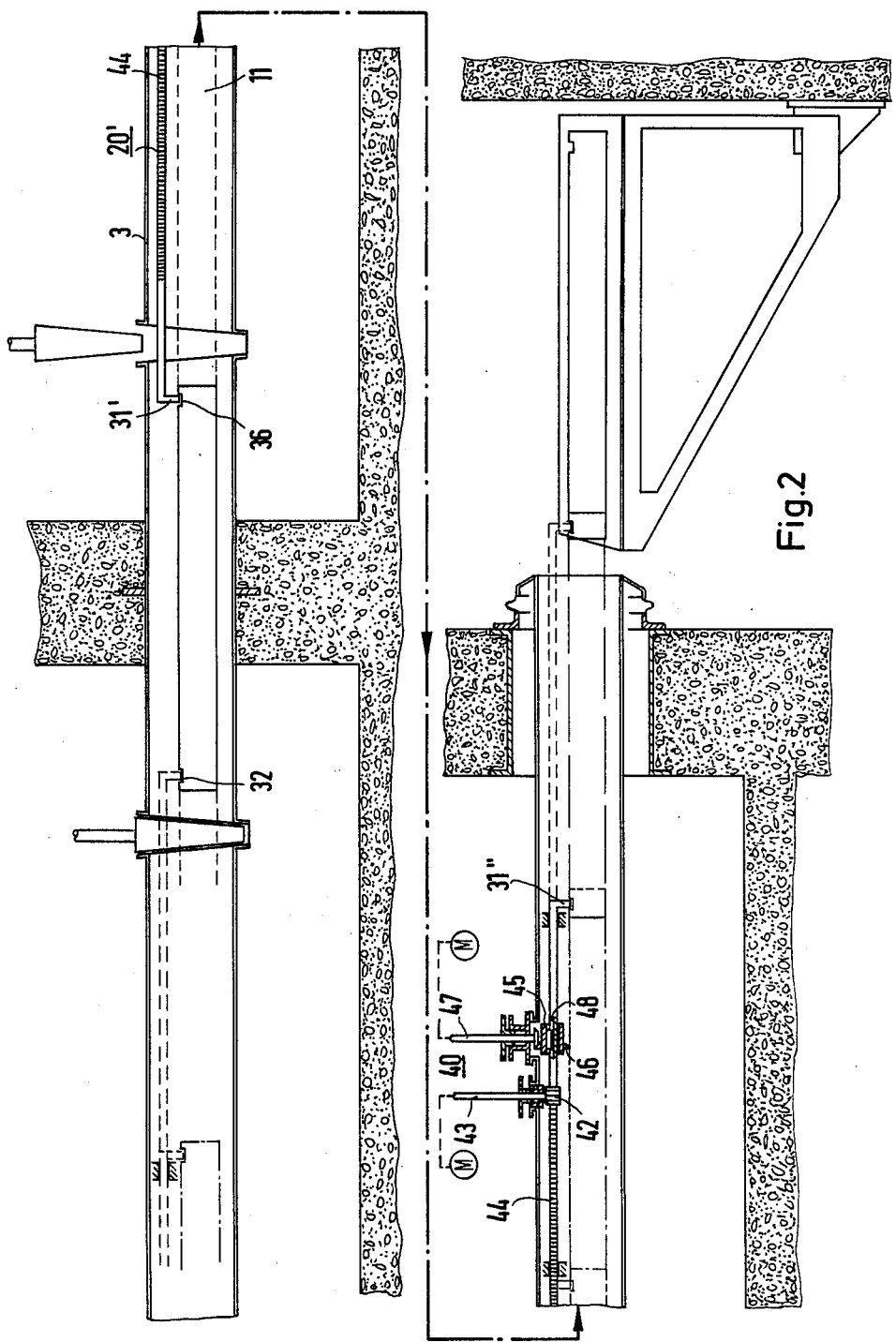
FIG. 2 is a corresponding vertical section but showing a second example.

In the embodiment example according to FIG. 2, the rod 20' designed as a rack with straight gearing is provided at both ends with gripper projections 31' and 31''. Its drive 40 is mounted in the center of the sliding carriage travel at the lock tube 3. It is moved by a pinion 42 which is connected with a transport shaft 43 and engages with the straight gearing 44.

The engagement of the projections 31' and 31'' is accomplished by rotating the rod 20' about is longitudinal axis. To rotate it, a dog 45, which slides, secured against rotation, in a slot 48 of the rod 20', is rotated by a locking shaft 47 via a set of miter gears 46.

Also in the example of the embodiment according to FIG. 2, the sliding carriage 11 is provided with two slots 32, 36, so that it can be moved in the lengthwise direction in two steps by twice the stroke of the rod 20'. However, as it is pushed in both directions by the central drive 40, the entire travel distance is equal to four times the stroke of the rod.

It is common to both embodiments of the invention that the lock chamber need not accommodate any cables which might have an adverse effect on the tightness when the sliding carriage is moved. Furthermore, the expenditure of means for the drive is considerably less than with a separate drive motor on the sliding carriage. At the same time, the safety is increased as the parts used in the invention are simple mechanical design elements which operate very reliably.

As a sliding carriage is denoted, as an embodiment of the invention, any transport arrangement for fuel assemblies which can be moved along a desired track by means of the rod. This is to cover, in particular, also carriages which have wheels, possibly for rails.

the motors M, e.g., electric reduction motors M, used to rotate the rods 27, 30, 43, 47, are advantageously mounted above the water level, not specifically shown, in the lock pit. They can be mounted at the edge of the pit. The connecting linkage may be equipped with spring-loaded plug couplings, so that a quick disassembly is possible. The plug couplings can also be designed so that they are opened and closed automatically by the motion of the tilting devices.

What is claimed is:

1. A nuclear reactor installation having a containment, a fuel assembly lock extending through the containment, an elongated fuel assembly carriage which is movable lengthwise through the lock, and at least one stationary motor having a drive for moving the carriage; wherein the improvement comprises said drive being formed by a rod that is movable in the lengthwise direction of the carriage, and means for releasably connecting the rod with the carriage, the rod being driven lengthwise by the motor, said means being for connecting the rod with the carriage at two positions spaced apart lengthwise with respect to the carriage.

2. The installation of claim 1 in which said stationary motor is positioned beyond one end of the lock and a second such motor is positioned beyond the other end of the lock and provided with a drive substantially corresponding to the aforesaid drive.

3. The installation of claim 1 in which said drive has a gear rack and pinion connection with the motor.

4. The installation of claim 1 in which a fuel assembly tilting device is positioned at one end of the lock and said drive is mounted on this device.

5. the installation of claim 1 in which said drive is positioned adjacent to the lock and said means is for releasably connecting both ends of the rod with the carriage.

6. The installation of claim 1 in which said means is operated by rotation of the rod.

* * * * *